US012744389B2

(12) United States Patent
Gorski

(10) Patent No.: US 12,744,389 B2
(45) Date of Patent: Sep. 22, 2026

(54) SYSTEM FOR STABILISING A DC LINK

(71) Applicant: THERMO KING LLC, Minneapolis, MN (US)

(72) Inventor: Matthias Gorski, Bochum (DE)

(73) Assignee: THERMO KING LLC, Minneapolis, MN (US)

( * ) Notice: Subject to any disclaimer, the term of this patent is extended or adjusted under 35 U.S.C. 154(b) by 261 days.

(21) Appl. No.: 18/591,240

(22) Filed: Feb. 29, 2024

(65) Prior Publication Data

US 2024/0297502 A1 Sep. 5, 2024

(30) Foreign Application Priority Data

Mar. 3, 2023 (EP) .................................... 23160039

(51) Int. Cl.
*H02J 3/36* (2026.01)
*H02J 3/00* (2026.01)
*H02J 3/32* (2026.01)

(52) U.S. Cl.
CPC ................ *H02J 3/36* (2013.01); *H02J 3/002* (2020.01); *H02J 3/322* (2020.01)

(58) Field of Classification Search
CPC .... H01J 3/002; H01J 3/322; H01J 3/36; H02J 3/002; H02J 3/322; H02J 3/36
USPC ........................................................... 307/32
See application file for complete search history.

(56) References Cited

U.S. PATENT DOCUMENTS

| | | | | |
|---|---|---|---|---|
| 10,337,767 | B2 * | 7/2019 | Senf, Jr. .................. | F25B 40/02 |
| 2020/0086712 | A1 | 3/2020 | Schumacher et al. | |
| 2020/0169083 | A1 | 5/2020 | Zubieta | |
| 2021/0070137 | A1 | 3/2021 | Andrade Dias et al. | |

OTHER PUBLICATIONS

Extended European Search Report, issued in the corresponding European patent application No. 23160039.6, dated Aug. 29, 2023, 7 pages.

* cited by examiner

*Primary Examiner* — Hal Kaplan
(74) *Attorney, Agent, or Firm* — HSML P.C.

(57) ABSTRACT

The present disclosure relates to a system for stabilising a DC link that supplies power to a load. The system comprises a power converter electrically coupled to the DC link. The power converter is configured to: supply power to or draw power from the DC link; monitor a voltage of the DC link; and control the power supplied to, or drawn from, the DC link based on the monitored voltage of the DC link and an operating voltage setpoint.

15 Claims, 5 Drawing Sheets

SYSTEM FOR STABILISING A DC LINK

FIELD

The present disclosure relates to a system for stabilising a DC link that supplies power to a load. The present disclosure relates further to a transport refrigeration system comprising a system for stabilising a DC link that supplies power to a load and to a transport refrigeration system comprising a load and a system for stabilising a DC link that supplies power to the load.

BACKGROUND

It is known to provide an electrical apparatus comprising a DC link for supplying power to an electrical component such as a motor which is configured to drive a mechanical load of a transport refrigeration system. The mechanical load of the transport refrigeration system may be, for instance, a compressor or a fan associated with a refrigeration circuit of the transport refrigeration system. The DC link may be configured to receive power from an external power supply via a power converter.

In use, a current drawn from the DC link by the load and/or a current supplied to the DC link by the external power supply via the power converter may vary. A voltage of the DC link may be subject to fluctuations as a result. If so, the electrical apparatus may unintentionally shut down, causing the mechanical load of the transport refrigeration system also to shut down. Adverse effects of such an event include spoiling of a cargo which is intended to be heated or cooled by the transport refrigeration system.

SUMMARY

The embodiments described herein provide a system for stabilising a DC link which is able to effectively and efficiently prevent and/or mitigate large fluctuations in a voltage of a DC link.

According to a first aspect, there is provided a system for stabilising a DC link that supplies power to a load, the system comprising: a power converter electrically coupled to the DC link; wherein the power converter is configured to: supply power to or draw power from the DC link; monitor a voltage of the DC link; and control the power supplied to, or drawn from, the DC link by the power converter based on the monitored voltage of the DC link and an operating voltage setpoint.

The operating voltage setpoint may be between 400 VDC and 1000 VDC. Optionally, the operating voltage setpoint may be between 500 VDC and 800 VDC.

It may be that the power converter is configured to: calculate an error value, wherein the error value is a result of subtracting the monitored voltage of the DC link from the operating voltage setpoint; and calculate a target power to supply to or draw from the DC link based on the error value. It may be that the power converter is configured to supply power to, or draw power from, the DC link in accordance with the calculated target power.

The power converter may be configured to supply power to the DC link if the error value is positive. The power converter may be configured to increase the target power to supply to the DC link in response to an increase in a magnitude of the error value. The power converter may be configured to draw power from the DC link if the error value is negative.

It may be that the power converter is configured to calculate the target power to supply to or draw from the DC link based on a proportional term. The proportional term may be obtained by multiplying the error value by a proportional coefficient.

It may be that the power converter is configured to calculate the target power to supply to or draw from the DC link based on the proportional term and an integral term. The proportional term may be obtained by multiplying the error value by a proportional coefficient. The integral term may be obtained by multiplying a time-integral of the error value by an integral coefficient.

The system may further comprise the load. It may be that the operating voltage setpoint is a first operating voltage setpoint, and the load is configured to: draw power from the DC link; monitor the voltage of the DC link; and reduce the power drawn from the DC link in response to a determination that the monitored voltage of the DC link is below a second operating voltage setpoint.

The load may be one of a plurality of loads electrically coupled to the DC link. It may be that each load is configured to: draw power from the DC link; monitor the voltage of the DC link; and reduce the power drawn from the DC link in response to a determination that the monitored voltage of the DC link is below the second operating voltage setpoint.

It may be that the or each load is configured to: calculate an error value, wherein the error value is a result of subtracting the monitored voltage of the DC link from the second operating voltage setpoint; and calculate a target power to draw from the DC link based on the error value. It may be that the or each load is configured to draw power from the DC link in accordance with the calculated target power.

It may be that the or each load is configured to calculate the target power to draw from the DC link based on a proportional term. The proportional term may be obtained by multiplying the error value by a proportional coefficient.

It may be that the or each load is configured to calculate the target power to draw from the DC link based on the proportional term and an integral term. The proportional term may be obtained by multiplying the error value by a proportional coefficient. The integral term may be obtained by multiplying a time-integral of the error value by an integral coefficient.

The or each load may include an inverter configured to generate an output voltage having an output frequency. The inverter may be configured to vary the output frequency and/or the output voltage to reduce the power drawn from the DC link by the load.

According to a second aspect, there is provided a transport refrigeration system comprising a system in accordance with the first aspect and a transport refrigeration unit.

According to a third aspect, there is provided a transport refrigeration system comprising: a system in accordance with the first aspect in which the or each load includes an inverter; and a transport refrigeration unit, wherein the or each inverter is electrically coupled to a motor, and wherein the motor is configured to drive a compressor, a pump or a fan of the transport refrigeration unit.

The or each load may include a power converter configured to generate an output voltage. The power converter of the or each load may be configured to vary the output voltage and/or a frequency of the output voltage to reduce the power drawn from the DC link by the load.

According to a fourth aspect, there is provided a transport refrigeration system comprising a system in accordance with the first aspect and a transport refrigeration unit. If the or each load includes a power converter, the or each power converter may be electrically coupled to a motor. The or each motor may be configured to drive a compressor, a pump or a fan of the transport refrigeration unit.

DETAILED DESCRIPTION

The present disclosure relates to a system for stabilising a DC link that supplies electrical power to a load. The system, the DC link and the load may form part of an electrical apparatus which is configured to supply electrical power to an electrical load of a transport refrigeration unit (TRU) from an external power supply when the TRU is not in transit.

More specifically, the present disclosure relates to a transport refrigeration system comprising a TRU and an electrical apparatus configured to supply electrical power to the electrical load of the TRU from a power supply (e.g. an external power supply) when the TRU is not in transit. The TRU may generally be configured to cool and/or heat a climate controlled compartment. The climate-controlled compartment can take the form of multiple compartments or have multiple zones. Exemplary transport refrigeration systems include an over-the-road trailer, an over-the-road truck body, a bus, a transport container and a railway car.

Figure 1:
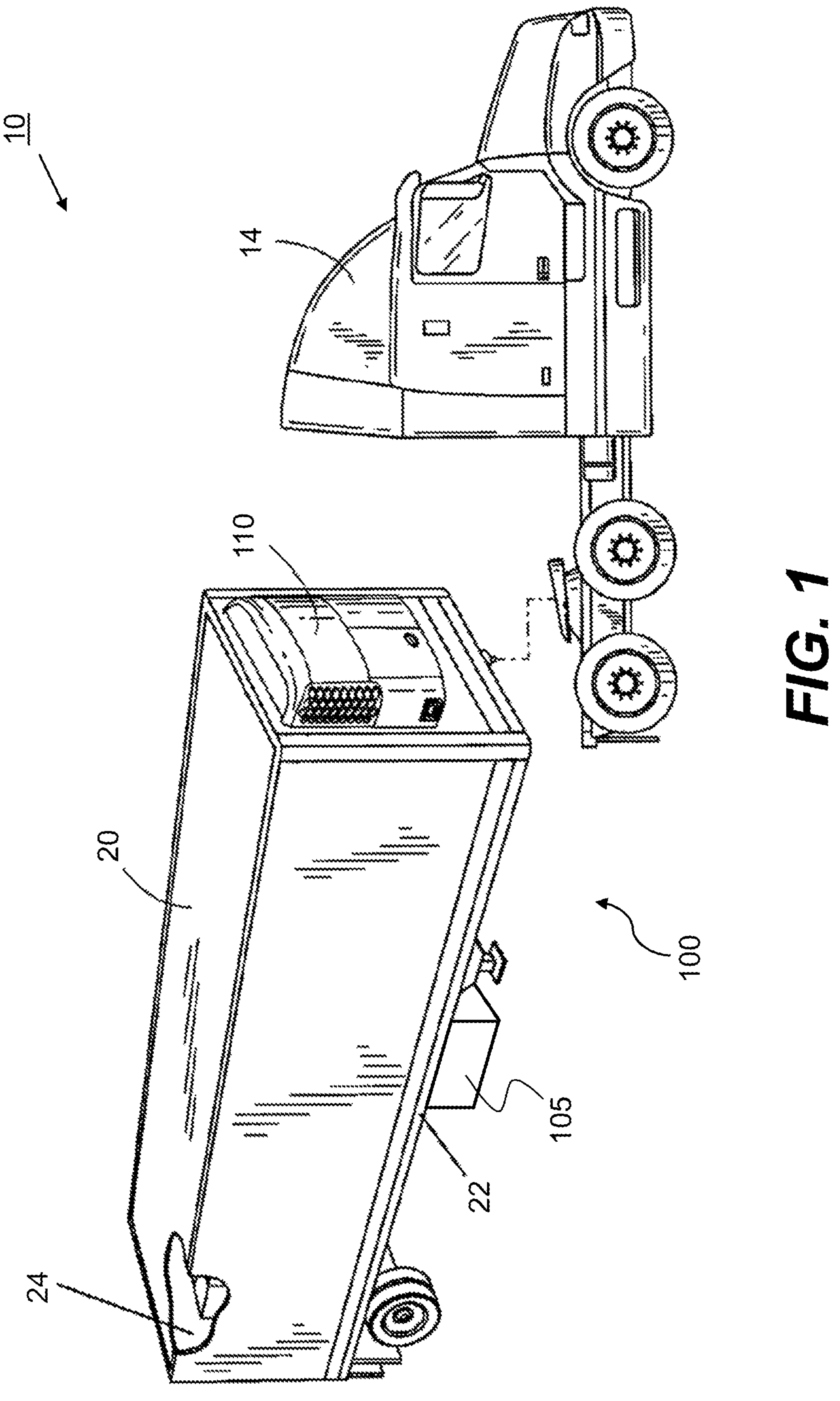
FIG. 1 shows a vehicle comprising a transport refrigeration system.

FIG. 1 shows a vehicle 10 comprising a transport refrigeration system 20. In the example of FIG. 1, the transport refrigeration system 20 is an over-the-road refrigerated semi-trailer 20 having a structure 22 supporting (or forming) a single climate-controlled compartment 24 which is configured to be cooled and/or heated by a TRU 110. The structure 22 includes a chassis. The vehicle 10 comprises an electrical apparatus 100 which includes various components disposed within an under-chassis box 105. In some examples, one or more components of the electrical apparatus 100 may be integrated or incorporated into the TRU 110. The structure 22 supports the TRU 110 and the under-chassis box 105. The vehicle 10 further comprises a tractor unit 14 removably couplable to the trailer 20. In other examples, the transport refrigeration system 20 may be, or may be part of, a temperature- or climate-controlled compartment of another type of vehicle such as, for instance, a truck which does not have a tractor unit which is removably couplable to a trailer.

Figure 2:
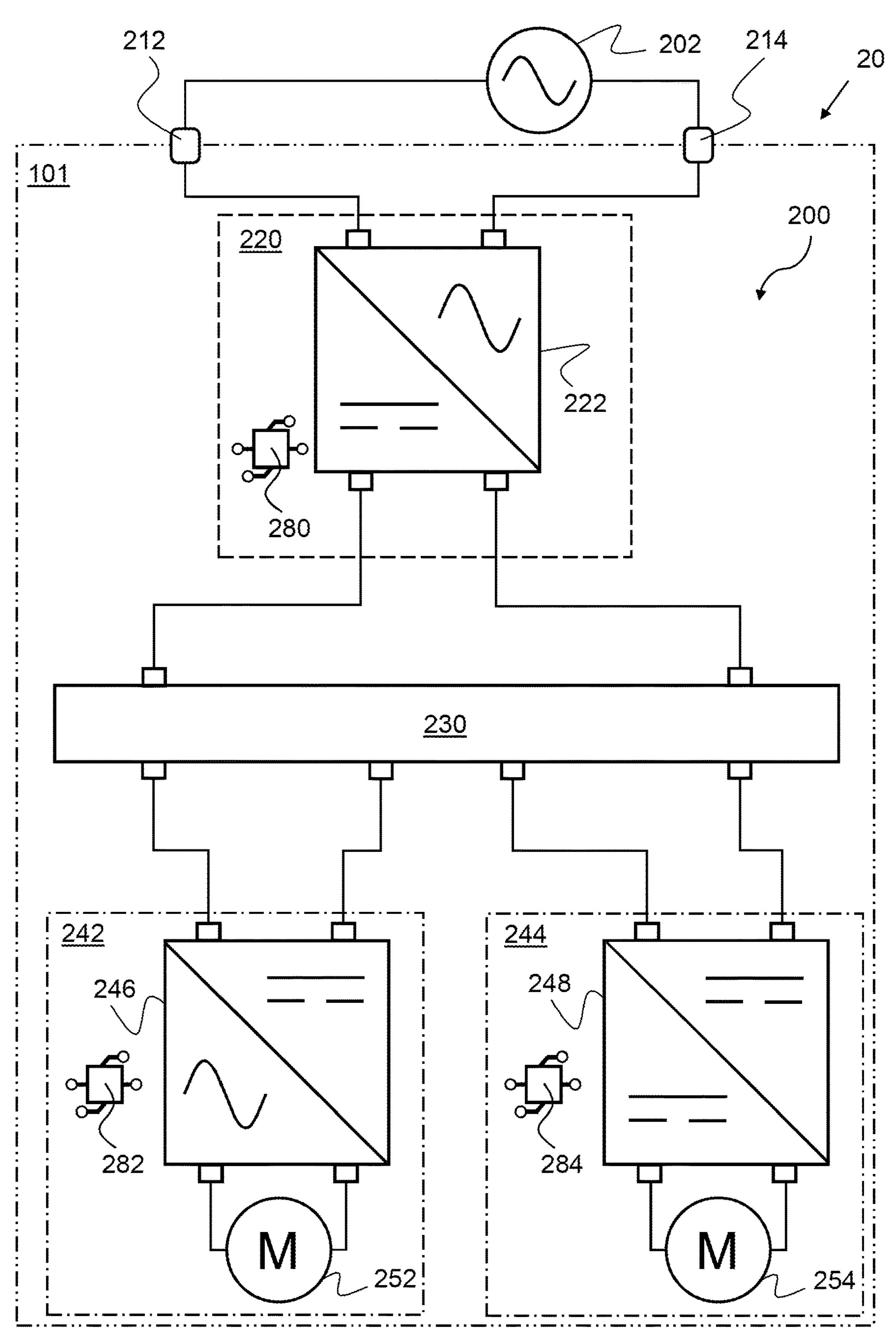
FIG. 2 shows a first example electrical apparatus suitable for use with the transport refrigeration system of FIG. 1.

FIG. 2 diagrammatically shows a first example electrical apparatus 101 suitable for use as the electrical apparatus 100 with the transport refrigeration system 20 of FIG. 1. The electrical apparatus 101 comprises a power converter 220, a DC link 230, a first load 242 and a second load 244. The power converter 220, the first load 242 and the second load 244 are each coupled to the DC link 230. Consequently, the DC link 230 is configured to electrically couple the power converter 220 to each of the first load 242 and the second load 244. The electrical apparatus 100 includes a system 200 for stabilising a voltage of the DC link 230. The system 200 includes at least the power converter 220 and may include at least one of the first load 242 and/or the second load 244.

The first example electrical apparatus 101 is electrically couplable to an external AC power supply 202 at an external connection port to which an external electrical cable can be connected. The external connection port is represented by a pair of external terminals 212 and 214 corresponding to "line" and "neutral" terminals, respectively, as will be understood by those skilled in the art. When an external electrical cable is connected to the external terminals 212, 214, the external AC power supply 202 may become available for supplying electrical power to the loads 242, 244 of the electrical apparatus 100 by means of the power converter 220 and the DC link 230. Therefore, in use, the DC link 230 supplies power to each of the first load 242 and the second load 244.

Also, in the first example electrical apparatus 101, the power converter 220 comprises an AC-DC source converter 222 which is operable in a rectifier mode to convert an alternating current received from the external AC power supply 202 through an input of the AC-DC source converter 222 into a direct current which is then supplied to the DC link 230 through an output of the AC-DC source converter 222. To this end, the AC-DC source converter 222 may comprise at least one power switching component and/or diode, as will be appreciated by those skilled in the art. When operated in the first mode, the power converter 222 draws power from the external AC power supply 202 and supplies power to the DC link 230.

The AC-DC source converter 222 may also be operable in an inverter mode to convert a direct current received from the DC link 230 through the output of the of the AC-DC source converter 222 into an alternating current which is then supplied to the external AC power supply 202. Accordingly, when operated in the second mode, the power converter 222 draws power from the DC link 230 and supplies power to the DC link 230.

Further, in the first example electrical apparatus 101, the first DC load 242 includes a load inverter 246 and the second DC load 244 includes a DC-DC load converter 248. The load inverter 246 is electrically coupled to an AC electrical component 252 whereas the DC-DC load converter 248 is electrically coupled to a DC electrical component 254. The DC-DC load converter 248 and the load inverter 246 may each be described as providing power conversion functionality to the first DC load 242, and therefore may both be referred to as a load power converter 246, 248 and the power converter 220 described herein may be referred to as a source power converter 220. By way of example, the AC electrical component 252 may be an AC motor which is mechanically coupled to configured to drive a mechanical load of the transport refrigeration system 20. Similarly, the DC electrical component 254 may be a DC motor which is configured to drive a mechanical load of the transport refrigeration system 20. The mechanical load of the transport refrigeration system 20 may be, for instance, a compressor, a pump or a fan of the TRU 110 (e.g. associated with a refrigeration circuit of the TRU 110).

The load inverter 246 is generally configured to convert a direct current received from the DC link 230 through an input of the load inverter 246 into an alternating current for supply to the AC electrical load 252 through an output of the load inverter 246. To this end, the load inverter 246 generates an AC output voltage having an output frequency.

Accordingly, the load inverter 246 may comprise at least one power switching component and/or at least one reactive component.

The DC-DC load converter 248 is generally configured to convert a direct current received from the DC link 230 through an input of the DC-DC load converter 248 at a first voltage magnitude into a direct current for supply to the DC electrical load 254 through an output of the DC-DC load converter 248 at a second voltage magnitude, wherein the first voltage magnitude corresponds to the voltage of the DC link 230 and the second voltage magnitude corresponds to an operating voltage (or rated voltage) of the DC electrical load 254. The DC-DC load converter 248 may be a buck converter, a boost converter, or a buck-boost converter.

Figure 3:
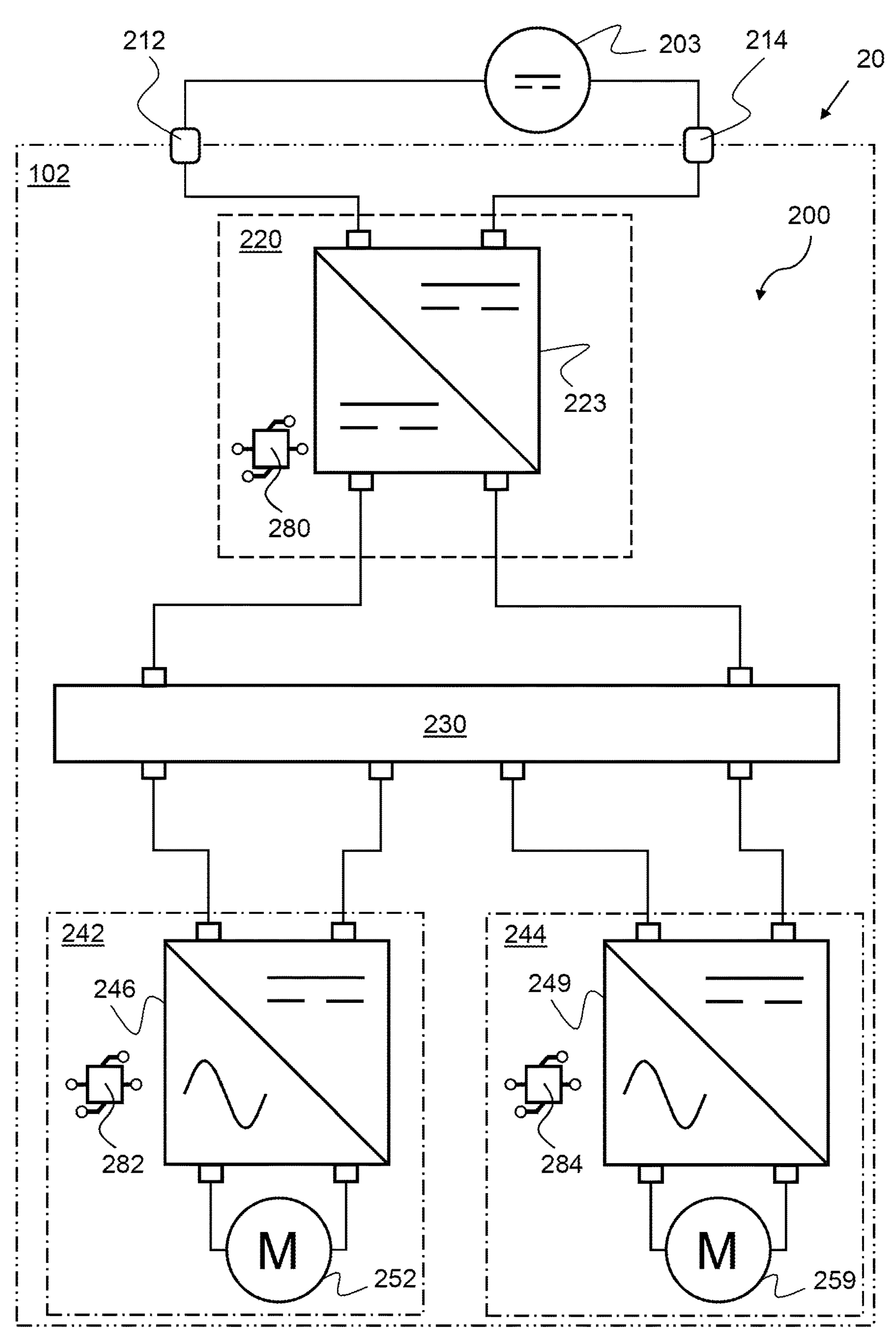
FIG. 3 shows a second example electrical apparatus suitable for use with the transport refrigeration system of FIG. 1.

FIG. 3 diagrammatically shows a second example electrical apparatus 102 suitable for use as the electrical apparatus 100 with the transport refrigeration system 20 of FIG. 1. The second example apparatus 102 is generally similar to the first example electrical apparatus 101 described above with reference to FIG. 2, with like reference signs indicating common or similar features.

However, in contrast to the first example electrical apparatus 101, the second example electrical apparatus 102 is electrically couplable to an external DC power supply 203 at the external connection port to which an external electrical cable can be connected rather than being electrically couplable to an external AC power supply 202 at the external connection port.

For this reason, in the second example electrical apparatus 102, the power converter 220 comprises a DC-DC source converter 223. The DC-DC source converter 223 is generally configured to convert a direct current received from the external DC power supply 203 through an input of the DC-DC source converter 223 at a first voltage magnitude into a direct current for supply to the DC link 230 through an output of the DC-DC source converter 223 at a second voltage magnitude, wherein the first voltage magnitude corresponds to an operating voltage of the external DC power supply 203 and the second voltage magnitude corresponds to the voltage of the DC link 230. The DC-DC source converter 223 may be a buck converter, a boost converter, or a buck-boost converter.

In addition, in the second example electrical apparatus 102, the load inverter 249 of the first load 242 is a first load inverter 246 and the second load 244 includes a second load inverter 249 which is electrically coupled to a second AC electrical component 259. The AC electrical component 252 is therefore referred to as a first AC electrical component 252 and the AC output voltage generated by the first load inverter 249 is referred to as a first AC output voltage having a first output frequency. The second load inverter 249 is generally configured to convert a direct current received from the DC link 230 through an input of the second load inverter 246 into an alternating current for supply to the second AC electrical load 259 through an output of the second load inverter 249. For this purpose, the second load inverter 249 generates a second AC output voltage having a second output frequency. The second load inverter 249 may also comprise at least one power switching component and/or at least one reactive component.

In both of the example electrical apparatuses 101, 102, the power converter 220 is provided with a power converter controller 280 which is configured to control operation of the power converter 220. The power converter controller 280 may be located within the power converter 220, such as within a housing of the power converter 220. The power converter 220 controller is generally configured to control operation of the power converter 220 according to the first method described below with reference to FIG. 4. The power converter controller 280 may comprise or be provided with an appropriate voltage transducer for monitoring the voltage of the DC link 230.

Likewise, in both of the example electrical apparatuses 101, 102, each load 242, 244 is provided with a respective load controller 282, 284 configured to control operation of the corresponding load 242, 244 according to the second method described below with reference to FIG. 5. Each load controller may be located within the respective load 242, 244, such as within a housing of the load 242, 244.

Figure 4:
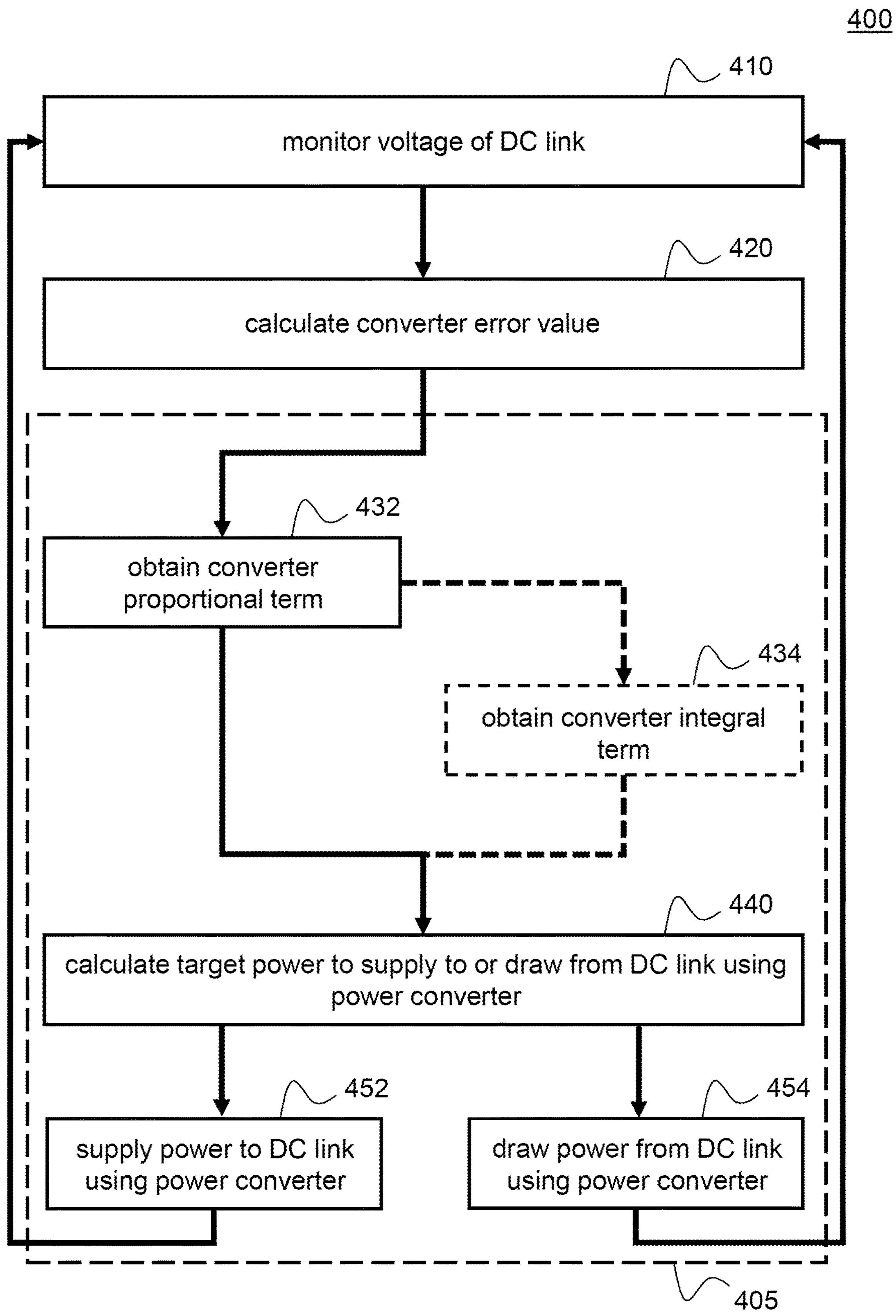
FIG. 4 shows an example method of controlling a power converter of the electrical apparatus of FIG. 2 or FIG. 3.

FIG. 4 is a flowchart which shows a method 400 of controlling the power converter 220 of the electrical apparatus 101, 102 of FIG. 2 or FIG. 3. As mentioned above, the method 400 is implemented by the power converter controller 280 such that the power converter 220 is configured to carry out the method 400. The method 400 comprises an action of monitoring (at block 410) the voltage of the DC link 230 using, for instance, the voltage transducer associated with the power converter controller 280. The action of monitoring the voltage of the DC link 230 may comprise storing a value of the monitored voltage of the DC link 230 in, for example, a memory of the power converter controller 280.

The method 400 further comprises an action of calculating (at block 420) a converter error value, $E_{c,m}(t)$. The converter error value is calculated as a difference between the monitored voltage, $V_m(t)$ of the DC link 230 (as monitored in block 410) and a converter DC link operating voltage setpoint, $V_{c,s}$ (referred to as a first operating voltage setpoint herein). In particular, the converter error value is calculated by subtracting the monitored voltage of the DC link 230 from the first operating voltage setpoint, per Equation (1) below.

$$E_{c,m}(t) = V_{c,s} - V_m(t) \tag{1}$$

Therefore, if the monitored voltage, $V_m(t)$, of the DC link 230 is less than the first operating voltage setpoint, $V_{c,s}$, the converter error value, $E_{c,m}(t)$, will be positive (that is, greater than zero). On the other hand, if the monitored voltage, $V_m(t)$, of the DC link 230 is greater than the first operating voltage setpoint, $V_{c,s}$, the converter error value, $E_{c,m}(t)$, will be negative (that is, less than zero).

The first operating voltage setpoint is selected as a value with respect to which the voltage of the DC link 230 is to be stabilised by the system 200. If the system 200 is to be adapted for use in the context of a transport refrigeration system 20 as described herein, the first operating voltage setpoint may be between 400 VDC and 1000 VDC inclusive. Optionally, the first operating voltage setpoint may be between 500 VDC and 800 VDC inclusive.

After calculating the converter error value, $E_{c,m}(t)$, the method 400 proceeds to an action of controlling the power supplied to or drawn from the DC link 230 by the power converter 220 (at block 405) based on the monitored voltage of the DC link 230 and the converter error value (and therefore the first operating voltage setpoint) to stabilise the voltage of the DC link 230. In general, the power converter 220 is able to control the power supplied to or drawn from the DC link 230 by varying a current supplied to or drawn from the DC link 230 by the power converter 220, as will be understood by those skilled in the art.

The action of controlling the power supplied to or drawn from the DC link 230 by the power converter 220 (at block 405) includes an action of obtaining (at block 432) a converter proportional term, $K_{c,p}(t)$, by multiplying the converter error value, $E_{c,m}(t)$, by a converter proportional coefficient, $C_{c,p}$, according to Equation (2) below. $C_{c,p}$ is a positive value, such that if $E_{c,m}(t)$ is positive, $K_{c,p}(t)$ will also be positive.

$$K_{c,p}(t) = C_{c,p} \times E_{c,m}(t) \tag{2}$$

In addition to the action of obtaining (at block 432) the converter proportional term, $K_{c,p}(t)$, the action of controlling the power supplied to or drawn from the DC link 230 by the power converter 220 (at block 405) may include an action of obtaining (at block 434) a converter integral term, $K_{c,i}(t)$, by multiplying a time-integral of the converter error value, $E_{c,m}(t)$, by a converter integral coefficient, $C_{c,i}$, according to Equation (3) below. $C_{c,i}$ is a positive value. Hence, if the time-integral of $E_{c,m}(t)$ is positive, $K_{c,i}(t)$ will also be positive. To prevent "controller windup" or any other undesirable control outcomes, the time-integral of $E_{l,m}(t)$ may only be computed between a time at which the error value was last equal to zero and a current time.

$$K_{c,i}(t) = C_{c,i} \times \int E_{c,m}(t)dt \tag{3}$$

The action of controlling the power supplied to or drawn from the DC link 230 by the power converter 220 (at block 405) also includes an action of calculating (at block 440) a converter target power, $P_{c,t}(t)$, to supply to or draw from the DC link 230 using the power converter 220 based on the converter error value, $E_{c,m}(t)$.

If the action of controlling the power supplied to or drawn from the DC link 230 by the power converter 220 (at block 405) includes both the actions of obtaining the converter proportional term, $K_{c,p}(t)$ (at block 432) and obtaining the converter integral term, $K_{c,i}(t)$ (at block 434), the action of calculating the converter target power, $P_{c,t}(t)$, to supply to or draw from the DC link 230 using the power converter 220 may be based on both the converter proportional term, $K_{c,p}(t)$, and the converter integral term, $K_{c,i}(t)$. If so, the power converter controller 280 (and the power converter 220) may be described as being adapted to perform a proportional-integral control based logic. Equation (4) is an example of a calculation which may be performed to determine the converter target power, $P_{c,t}(t)$, to supply to or draw from the DC link 230 using the power converter 220.

$$P_{c,t}(t) = K_{c,p}(t) + K_{c,i}(t) \tag{4}$$

However, if the action of controlling the power supplied to or drawn from the DC link 230 by the power converter 220 (at block 405) does not include the action of obtaining the converter integral term (at block 434), the action of calculating the converter target power, $P_{c,t}(t)$, to supply to or draw from the DC link 230 using the power converter 220 is based on the converter proportional term but not on any converter integral term. If so, the power converter controller 280 may be described as being adapted to perform a proportional control based logic. Equation (5) is an example of a calculation which may be performed to determine the converter target power, $P_{c,t}(t)$, to supply to or draw from the DC link 230 using the power converter 220.

$$P_{c,t}(t) = K_{c,p}(t) \tag{5}$$

The action of controlling the power supplied to or drawn from the DC link 230 by the power converter 220 (at block 405) then includes either an action of supplying power to the DC link 230 (at block 452) or an action of drawing power from the DC link 230 (at block 454) using the power converter 220. The actions of supplying power to the DC link 230 and drawing power from the DC link 230 (at blocks 452 and 454, respectively) using the power converter are performed in accordance with the results of the calculation of the converter target power $P_{c,t}(t)$ (at block 440). Therefore, the power converter 220 is configured to control the power supplied to or drawn from the DC link 230 based on the monitored voltage of the DC link 230 and the first operating voltage setpoint as a consequence of the converter target power, $P_{c,t}(t)$, being determined based on the converter error value (at block 440). The actual power supplied to the DC link 230 or the actual power drawn from the DC link 230 (as a result of the actions in blocks 452 and 454, respectively) is denoted by $P_{c,a}(t)$.

The converter target power $P_{c,t}(t)$ being positive indicates that power should be supplied to the DC link 230 by the power converter 220 in order to maintain the voltage of the DC link 230 at the first operating voltage setpoint or within an acceptable tolerance range of the first operating voltage setpoint (in other words, to stabilise the voltage of the DC link 230 with respect to the first operating voltage setpoint). Conversely, the converter target power $P_{c,t}(t)$ being negative indicates that power should be drawn from the DC link 230 by the power converter 220 in order to maintain the voltage of the DC link 230 at the first operating voltage setpoint or within the acceptable tolerance range of the first operating voltage setpoint.

Therefore, if converter target power $P_{c,t}(t)$ is positive, the action of controlling the power supplied to or drawn from the DC link 230 by the power converter 220 (at block 405) includes the action of supplying power to the DC link 230 (at block 452) so as to stabilise the voltage of the DC link 230. If the power converter 220 comprises an AC-DC source converter 222, as described above with respect to FIG. 2, the power converter 220 is operated in the rectifier mode in order to supply power to the DC link 230. Conversely, if the converter target power $P_{c,t}(t)$ is negative, the method 400 includes the action of drawing power from the DC link 230 (at block 454) for the purpose of stabilising the voltage of the DC link 230. If the power converter 220 comprises an AC-DC source converter 222, as described above with respect to FIG. 2, the power converter 220 is operated in the inverter mode in order to draw power from the DC link 230.

In particular, the action of drawing power from the DC link 230 (at block 454) is carried out with an aim of drawing the converter target power $P_{c,t}(t)$ from the DC link 230 using the power converter 220 such that the actual power $P_{c,a}(t)$ supplied to the DC link 230 is equal to the converter target power $P_{c,t}(t)$. In a similar way, the action of suppling power to the DC link 230 (at block 452) is carried out with an aim of supplying the converter target power $P_{c,t}(t)$ to the DC link 230 using the power converter 220 such that the actual power $P_{c,a}(t)$ drawn from the DC link 230 is equal to the converter target power $P_{c,t}(t)$.

The converter target power, $P_{c,t}(t)$, being determined based on the converter proportional term, $K_{c,p}(t)$, means that the power converter 220 (e.g. the power converter controller 280) is configured to increase the magnitude of $P_{c,t}(t)$ in response to an increase in the magnitude of the converter error value, $E_{c,m}(t)$. If the converter error value has a positive sign (e.g. is positive), this results in the power converter 220 increasing the converter target power, $P_{c,t}(t)$, to supply to the DC link 230. Conversely, if the converter error value has a negative sign (e.g. is negative), this results in the power converter 220 increasing the converter target power, $P_{c,t}(t)$, to draw from the DC link 230.

However, in practice it may be that the power converter 220 is unable to supply the converter target power $P_{c,t}(t)$ to the DC link 230. For instance, it may be that the characteristics of the external electrical cable or power supply 202, 203 impose an upper limit on the actual power $P_{c,a}(t)$ which the power converter 220 is able to draw from the power supply 202, 203 and subsequently supply to the DC link 230 (at block 452). In particular, the external electrical cable or power supply 202, 203 may have a maximum current rating which corresponds to the upper limit on the actual power which the power converter is able to draw from the power supply 202, 203. Otherwise, it may be that the power converter 220 has a maximum power rating (e.g. a maximum current rating) which corresponds to the upper limit on the actual power (e.g. the current) which the power converter 220 is able to transfer from the power supply 202, 203 to the DC link 230. In some examples, the power converter controller 280 may be configured to ensure that the power drawn from or supplied to the DC link 230 never exceeds the maximum power rating of the power converter 220 so as to protect the power converter 220 from damage. However, the maximum current rating of the external electrical cable and/or the power supply 202, 203 may not be known by the power converter controller 280. If so, the power converter 220 will simply be unable to draw more power from the power supply 202, 203 than the upper limit on the actual power despite any actions by the power converter controller 280 to attempt to do so.

The upper limit on the actual power $P_{c,a}(t)$ which the power converter 220 is able to draw from the power supply may be referred to as a maximum converter power input, $P_{c,max}$. As a result, the actual power supplied to the DC link 230 by the power converter 220 in use is expressed by Equation (6) below.

$$P_{c,a}(t) = \begin{cases} P_{c,t}(t), & 0 < P_{c,t}(t) \leq P_{c,max} \\ P_{c,max}, & P_{c,t}(t) \geq P_{c,max} \end{cases} \quad (6)$$

Subsequent to the actions represented by each of blocks 452 and 454, the example method 400 of FIG. 4 returns to the action of monitoring the voltage of the DC link 230 (at block 410) and continues thereafter as described above, thereby executing a converter control loop. Therefore, the method 400 includes repeatedly performing each of the actions represented each of the blocks shown by FIG. 4 as described herein as the converter control loop is repeatedly executed by the power converter controller 280.

Figure 5:
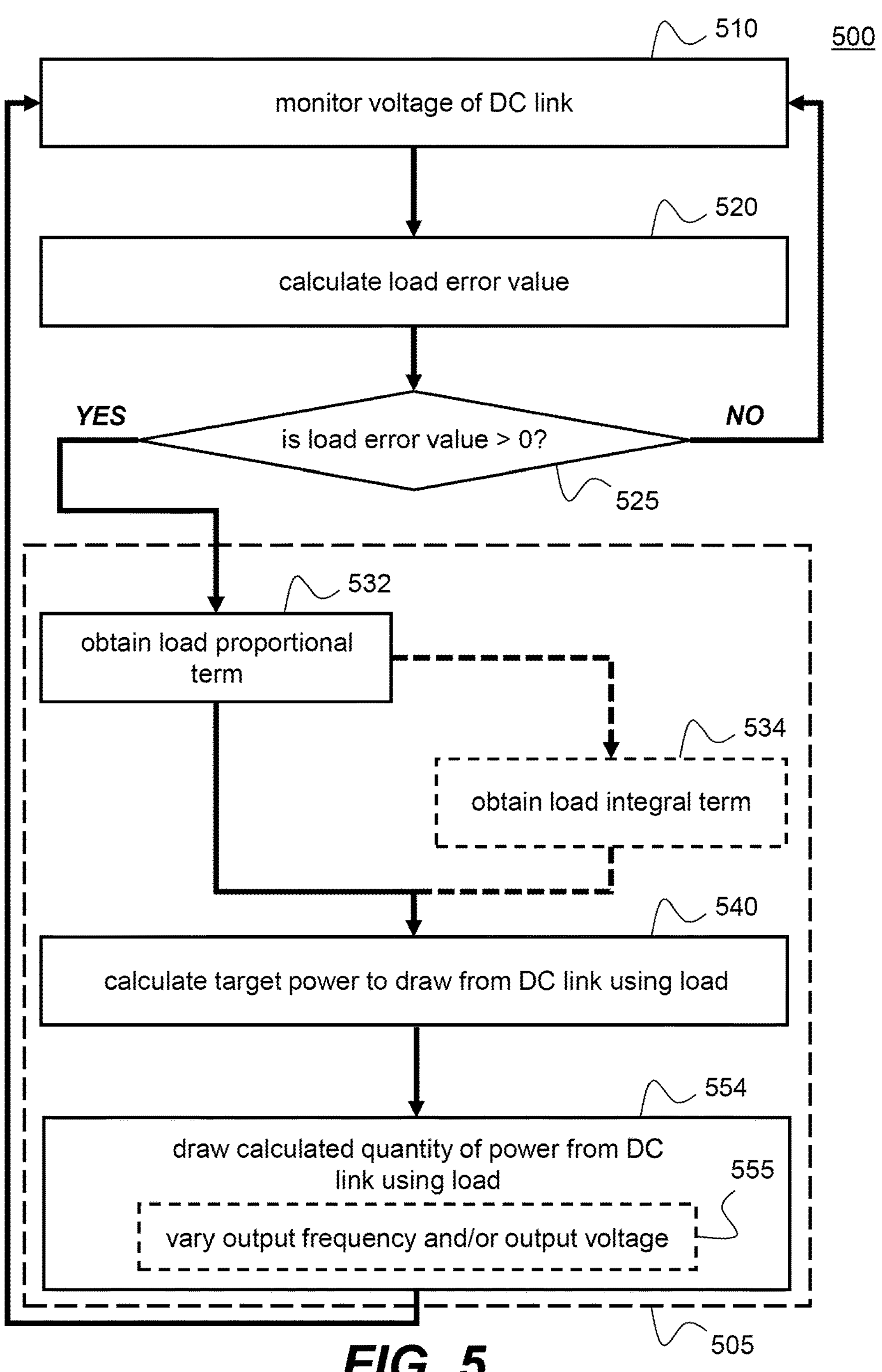
FIG. 5 shows an example method of controlling a load of the electrical apparatus of FIG. 2 or FIG. 3.

FIG. 5 is a flowchart which shows a method 500 of controlling the or each load 242, 244 of the electrical apparatus 101, 102 of FIG. 2 or FIG. 3. As mentioned above, the method 500 is implemented by the load controller 282, 284 such that the respective load 242, 244 is configured to carry out the method 500. In a similar way to the first example method 400, the second example method 500 comprises an action of monitoring (at block 510) the voltage of the DC link 230 using, for instance, the voltage transducer provided to the load 242, 244. The action of monitoring the voltage of the DC link 230 may comprise storing a value of the monitored voltage of the DC link 230 in, for example, a memory of the load 242, 244. Even though the or each load 242, 244 is configured to monitor the voltage of the DC link 230 independently of the power converter 280 monitoring the voltage of the DC link 230, the value of the voltage of the DC link 230 as monitored by the load 242, 244 will be substantially the same as the value of the voltage of the DC link 230 as monitored by the power converter 220.

The method 500 further comprises an action of calculating (at block 520) a load error value, $E_{l,m}(t)$. The load error value is calculated in a similar way as described above with respect to FIG. 4 (at block 420). Namely, load error value is calculated as a difference between the monitored voltage, $V_m(t)$ of the DC link 230 (as monitored in block 410) and a load DC link operating voltage setpoint, $V_{l,s}$ (referred to as a second operating voltage setpoint herein). Specifically, the load error value is calculated by subtracting the monitored voltage of the DC link 230 from the second operating voltage setpoint, per Equation (7) below.

$$E_{l,m}(t) = V_{l,s} - V_m(t) \quad (7)$$

Therefore, if the monitored voltage, $V_m(t)$, of the DC link 230 is less than the second operating voltage setpoint, $V_{l,s}$, the load error value, $E_{l,m}(t)$, will be positive (that is, greater than zero). On the other hand, if the monitored voltage, $V_m(t)$, of the DC link 230 is greater than the second operating voltage setpoint, $V_{l,s}$, the load error value, $E_{l,m}(t)$, will be negative (that is, less than zero).

In some embodiments of the disclosure, the or each load 242, 244 may be generally unable to supply power to the DC link 230. In other embodiments of the disclosure, the or each load 242, 244 may comprise at least one component which is adapted to store electrical energy and so is able to supply power to the DC link 230. However, in such embodiments, supplying power to the DC link 230 from the load 242, 244 is undesirable. Therefore, the load controller 282, 284 is configured to vary the power drawn from the DC link 230 based on the monitored voltage of the DC link 230 and the second operating voltage setpoint for the purpose of stabilising the DC link 230 as described in further detail below. However, unlike the power converter controller 280, the load controller 282, 284 is not configured to cause power to be supplied to the DC link 230 for the same purpose.

To this end, the method 500 includes an action of determining whether the load error value is greater than zero (at block 525). If the result of the determination is positive (that is, the load error value is greater than zero), the method 500 proceeds to an action of controlling the power drawn from the DC link 230 by the load 242, 244 (at block 505) based on the monitored voltage of the DC link 230 and the load error value (and therefore the second operating voltage setpoint) to stabilise the voltage of the DC link 230. Alternatively, if the result of the determination is negative (that is, the load error value is not greater than zero), the method 500 returns to the action represented by block 510 described above so that the load controller 282, 284 does not immediately take any actions to stabilise the voltage of the DC link 230 (unless it is subsequently determined that the load error value is greater than zero as the method 500 continues).

In the example method 500, the action of controlling the power drawn from the DC link 230 by the load 242, 244 includes an action of obtaining (at block 532) a load proportional term, $K_{l,p}(t)$, by multiplying the load error value, $E_{l,m}(t)$, by a load proportional coefficient, $C_{l,p}$, according to Equation (8) below. $C_{l,p}$ is a positive value, such that if $E_{l,m}(t)$ is positive, $K_{l,p}(t)$ is also positive.

$$K_{l,p}(t) = C_{l,p} \times E_{l,m}(t) \tag{8}$$

In addition to the action of obtaining (at block 532) the load proportional term, $K_{l,p}(t)$, the action of controlling the power drawn by the DC link 230 by the load 242, 244 (at block 505) may include an action of obtaining (at block 534) a load integral term, $K_{l,i}(t)$, by multiplying a time-integral of the load error value, $E_{l,m}(t)$, by a load integral coefficient, $C_{l,i}$, according to Equation (9) below. $C_{l,i}$ is a positive value. Hence, if the time-integral of $E_{l,m}(t)$ is positive, $K_{l,i}(t)$ will also be positive. To prevent "controller windup" or any other undesirable control outcomes, the time-integral of $E_{l,m}(t)$ may only be computed between a time at which the error value was last equal to zero and a current time.

$$K_{l,i}(t) = C_{l,i} \times \int E_{l,m}(t)dt \tag{9}$$

The action of controlling the power drawn by the DC link 230 by the load 242, 244 (at block 505) also includes an action of calculating (at block 540) a load target power, $P_{l,t}(t)$, to draw from the DC link 230 using the load 242, 244 based on the load error value, $E_{l,m}(t)$, and a load desired power, $P_{l,d}(t)$. The load desired power, $P_{l,d}(t)$, may correspond to a power which is required to drive the mechanical load of the transport refrigeration system 20 at a specified operating point. In particular, the specified operating point to which the mechanical load is to be driven may be associated with a cooling demand and/or a heating demand on the transport refrigeration system 20. For example, it may be that a controller of the transport refrigeration system a compressor of the transport refrigeration system 20 demands that the load desired power, $P_{l,d}(t)$, be varied so as to operate the compressor at a different speed and/or a different pressure ratio as the cooling demand and/or the heating demand on the transport refrigeration system 20 varies.

If the action of controlling the power drawn by the DC link 230 by the load 242, 244 (at block 505) includes both the actions of obtaining the load proportional term, $K_{l,p}(t)$ (at block 532) and obtaining the load integral term, $K_{l,i}(t)$ (at block 534), the action of calculating the load target power, $P_{l,t}(t)$, to draw from the DC link 230 using the load 242, 244 may be based on both the load proportional term, $K_{l,p}(t)$, and the load integral term, $K_{l,i}(t)$. If so, the load controller 282, 284 (and the load 242, 244) may be described as being adapted to perform a proportional-integral control based logic. Equation (10) is an example of a calculation which may be performed to determine the load target power, Put (t), to draw from the DC link 230 using the load 242, 244.

$$P_{l,t}(t) = P_{l,d}(t) - [K_{l,p}(t) + K_{l,i}(t)] \tag{10}$$

As discussed above, the time-integral of $E_{l,m}(t)$ may only be computed between a time at which the error value was last equal to zero and a current time. As a result, the value of $K_{l,i}(t)$ as determined according to Equation (9) is always positive. Further, because the value of $K_{l,p}(t)$ is always positive when $E_{l,m}(t)$, it follows that the result of Equation (10) may never be such that $P_{l,t}(t)$ is greater than $P_{l,d}(t)$. Other techniques for ensuring that the value of $P_{l,t}(t)$ is never greater than $P_{l,d}(t)$ may also be used in accordance with the present disclosure. This ensures that the load controller 282, 284 never attempts to draw a target load power, $P_{l,t}(t)$, from the DC link 230 which is greater than the desired load power, $P_{l,d}(t)$ (see the description with respect to block 554 below).

However, if the action of controlling the power drawn by the DC link 230 by the load 242, 244 (at block 505) does not include the action of obtaining the load integral term (at block 534), the action of calculating the load target power, $P_{l,t}(t)$, to draw from the DC link 230 using the load 242, 244 is based on the load proportional term but not on any load integral term. If so, the load controller 282, 284 may be described as being adapted to perform a proportional control based logic. Equation (11) is an example of a calculation which may be performed to determine the load target power, $P_{l,t}(t)$, to draw from the DC link 230 using the load 242, 244.

$$P_{l,t}(t) = P_{l,d}(t) - [K_{l,p}(t)] \tag{11}$$

The load target power, $P_{l,t}(t)$, being determined based on the load proportional term, $K_{l,p}(t)$, (and the load desired power, $P_{l,d}(t)$) means that the load 242, 244 (e.g. the load controller 282, 284) is configured to reduce the magnitude of the power drawn from the DC link 230, $P_{l,t}(t)$ in response to the monitored voltage of the DC link being below the second operating voltage setpoint (that is, in response to the determination at block 525 that the load error value, $E_{l,m}(t)$ is positive and therefore that the monitored voltage on the DC link 230 is below the second operating voltage setpoint).

The action of controlling the power drawn by the DC link 230 by the load 242, 244 (at block 505) then includes an action of drawing power from the DC link 230 (at block 554) using the load 242, 244 in accordance with the results of the calculation of the load target power $P_{l,t}(t)$ (at block 540). Therefore, the load 242, 244 is configured to control the power drawn from the DC link 230 based on the monitored voltage of the DC link 230 and the second operating voltage setpoint as a consequence of the load target power, $P_{l,t}(t)$, being determined based on the load error value (at block 540).

If the or each load 242, 244 comprises an inverter 246, 249, the action of drawing power from the DC link 230 (at block 554) using the load 242, 244 in accordance with the results of the calculation of the load target power (at block 540), the respective inverter 246, 249 may be configured to vary the AC output voltage and/or the output frequency provided to the AC electrical component 252, 259 (at block 555). For instance, if the AC electrical component 252, 259 is an AC motor, reducing the output frequency of the inverter 246, 249 may cause the AC motor to run at a lower speed and therefore reduce the power consumption of the AC motor. Similarly, reducing the output voltage of the inverter 246, 249 to the AC motor may directly lead to the power consumption of the AC motor being reduced. In a similar way, if the or each load 242, 244 comprises a DC-DC converter 248, the action of drawing power from the DC link 230 (at block 554) using the load 242, 244 in accordance with the results of the calculation of the load target power (at block 540), the respective DC-DC converter 248 may be configured to vary the second voltage magnitude so as to vary a DC output voltage provided to the DC electrical component 254 (at block 555). Reducing the output voltage of the DC-DC converter 248 to the DC motor may directly lead to the power consumption of the DC motor being reduced.

As will be understood by those skilled in the art, any reduction in the power consumption of the AC motor is associated with a possible deviation from the specified operating point for the mechanical load of the transport refrigeration system 20. However, the action(s) represented by block 554 enable the voltage of the DC link 230 to be stabilised with respect to the second operating voltage setpoint, thereby preventing large fluctuations in the voltage of the DC link 230 and/or an unintended shut down of the electrical apparatus 101, 102 and/or the transport refrigeration system 20.

Subsequent to the action represented by block 544, the method 500 of FIG. 5 returns to the action of monitoring the voltage of the DC link 230 (at block 510) and continues thereafter, thereby executing a load control loop. Therefore, the example method 500 includes repeatedly performing each of the actions represented by each of the blocks shown by FIG. 5 as described herein as the load control loop is repeatedly executed by the load controller(s) 282, 284.

Optionally, the second operating voltage setpoint used by the load 242, 244 may not be the same as (i.e. dissimilar to) the first operating voltage setpoint used by the power converter 220 (at block 420). If so, because the operating voltage setpoints, $V_s$, and the monitored voltage, $V_m(t)$, are different for the power converter 220 and the or each load 242, 244, the load error value, $E_{l,m}(t)$, calculated by the or each load controller 282, 284 (at block 520) will be different to the converter error value $E_{l,m}(t)$ calculated by the power converter controller 280 (at block 420). In particular, it may be that the second operating voltage setpoint used by the load controller 282, 284 is lower than the first operating voltage setpoint used by the power converter controller 280. This ensures that the power converter controller 280 first attempts to control the power supplied to the DC link 230 by the power converter 220 (at block 405) in response to a reduction in the voltage of the DC link 230 before the or each load controller 282, 284 attempts to control the power drawn from the DC link 230 by the load 242, 244 (at block 505) in response to the voltage of the DC link 230 having fallen below the second operating voltage setpoint. As a result, the system 200 prioritises the power converter controller 280 attempting to supply more power to the DC link 230 using the power converter 220 for the purpose of stabilising the voltage of the DC link 230 ahead of the load controller 282, 284 attempting to draw less power from the DC link 230 using the load 242, 244 for the same purpose. Accordingly, the actual power supplied to the or each load 242, 244 by the DC link 230 may be subject to fewer variations in use. In turn, this may facilitate a reduction in a number of deviations from the specified operating point for the mechanical load of the transport refrigeration system 20 during operation.

Otherwise, the second operating voltage setpoint used by the load 242, 244 may be the same as the first operating voltage setpoint used by the power converter 220 (at block 420). If so, because both the operating voltage setpoints, $V_s$, and the monitored voltage, $V_m(t)$, are substantially the same for the power converter 220 and the or each load 242, 244, the load error value, $E_{l,m}(t)$, calculated by the or each load controller 282, 284 (at block 520) will be substantially the same as the converter error value $E_{l,m}(t)$ calculated by the power converter controller 280 (at block 420).

Although the various actions of the example methods 400, 500 described herein are illustrated as being carried out sequentially (that is, in turn) in FIGS. 4 and 5, it will be appreciated that one or more of the actions represented by the respective blocks in each of FIGS. 4 and 5 may be carried out concurrently (that is, in parallel), if appropriate.

With regards to the preceding description, it has been described that the power converter 220 is configured to control the power supplied to or drawn from the DC link 230 based on the monitored voltage of the DC link 230 and a single first operating voltage setpoint. Further, the specific examples of calculation of the converter error value, the converter proportional term and the converter integral term have been provided with reference to a single first operating voltage setpoint. However, this disclosure envisages that the power converter 220 may be configured to control the power supplied to or drawn from the DC link based on the monitored voltage of the DC link 230, an upper first operating voltage setpoint and a lower first operating voltage setpoint, with the upper first operating voltage setpoint and the lower first operating voltage setpoint defining a first permitted operating voltage range. The or each load 242, 244 may be similarly configured to reduce the power drawn from the DC link 230 in response to a determination that the monitored voltage of the DC link 230 is below a second permitted operating voltage range (that is, is below both a second lower operating voltage setpoint and the second upper voltage setpoint which together define the second permitted operating voltage range).

If so, $E_{c,m}(t)$ and/or $E_{l,m}(t)$ as applicable may be set as being equal to zero when the monitored voltage of the DC link 230 lies within the respective operating voltage range. As a result, the permitted operating voltage range serves the purpose of a deadband in which the voltage of the DC link 230 is permitted to vary without resulting in a change of operation of the power converter 220 and/or the load 242, 244. Otherwise, when the monitored voltage of the DC link 230 lies outside of the permitted operating voltage range, calculation of $E_{c,m}(t)$ or $E_{l,m}(t)$ may be performed with respect to either the respective upper operating voltage setpoint or the respective lower operating voltage setpoint as appropriate. By way of example, if the monitored voltage of the DC link 230 is less than the permitted operating voltage range, calculation of $E_{c,m}(t)$ or $E_{l,m}(t)$ may be performed with respect to lower operating voltage setpoint. If the system 200 is to be adapted for use in the context of a transport refrigeration system 20 as described herein, each operating voltage setpoint may be between 400 VDC and 1000 VDC inclusive. Optionally, each operating voltage setpoint may be between 500 VDC and 800 VDC inclusive. More specifically, each operation voltage setpoint may be between 500 VDC and 600 VDC inclusive.

This disclosure envisages that the actions of controlling the power supplied to or drawn from the DC link 230 by the power converter 220 (at block 405) and/or controlling the power drawn from the DC link 230 by the load 242, 244 (at block 505) may be implemented in ways other than the specific examples described above with regards to FIGS. 4 and 5, respectively. For example, the action of controlling the power drawn from the DC link 230 by the load 242, 244 (at block 505) may be implemented by the load controller 282, 284 switching the or each load 242, 244 from a desired operating state (that is, a state in which the load 242, 244 consumes the desired load power) to a pre-determined de-rated operating state (that is, a state in which the load 242, 244 consumes less than the desired load power) in response to a determination (e.g. at block 525) that the monitored voltage of the DC link 230 is below the second operating voltage setpoint so as to reduce the power drawn from the DC link 230 by the or each load 242, 244. The action of controlling the power supplied to or drawn from the DC link 230 by the power converter 220 (at block 405) may be similarly implemented by the power converter controller 280 switching the power converter 220 between a plurality of pre-determined operating states to vary the power supplied to or drawn from the DC link 230 as applicable.

Further, although it has been described that each electrical apparatus 101, 102 is electrically couplable to an appropriate external power supply 202, 203 at the external connection port, it may be that the relevant power supply is internal to (e.g. disposed within) the electrical apparatus 101, 102. If so, the electrical apparatus 101, 102 may not comprise an external connection port to which an external electrical cable can be connected.

The system 200 and methods 400, 500 described herein provide fast-acting means for stabilising the voltage of the DC link 230 with respect to the operating voltage setpoint by ensuring that each of the power converter 220 and/or each load 242, 244 monitors the voltage of the DC link 230 and subsequently implements a control logic for maintaining the voltage of the DC link 230 at the operating voltage setpoint or within a target range (e.g. within the permitting operating voltage range defined by the first operating voltage setpoint and the second operating voltage setpoint). The monitored voltage of DC link 230 being used as a common control input for each of the power converter 220 and the loads 242, 244 ensures that each of the converter 220 and the loads 242, 244 co-operate to achieve the same control objective of stabilising the voltage of the DC link 230. In particular, this is achieved without requiring dedicated means for data communication between the controllers 280, 282, 284 of the power converter 220 and the loads 242, 244 or a central/unified controller which controls the operation of the power converter 220 and the loads 242, 244. As a result, a speed at which the system 200 is able to react to changes in the voltage of the DC link 230 and execute remedial actions to stabilise the voltage of the DC link 230 is relatively increased. The increased speed of the system 200 is associated with improved stability of the voltage of the DC link 230 because the system 200 is able to react to any fluctuations in the voltage of the DC link 230 and take remedial action more quickly.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. A system for stabilising a DC link that supplies power to a load, the system comprising:
- a power converter electrically coupled to the DC link;
- wherein the power converter is configured to:
  - supply power to or draw power from the DC link;
  - monitor a voltage of the DC link; and
  - control the power supplied to or drawn from the DC link based on the monitored voltage of the DC link and an operating voltage setpoint, the operating voltage setpoint being a value with respect to which the voltage of the DC link is to be stabilized by the system.

2. The system of claim 1, wherein the power converter is configured to:
- calculate an error value, wherein the error value is a result of subtracting the monitored voltage of the DC link from the operating voltage setpoint;
- calculate a target power to supply to or draw from the DC link based on the error value; and
- supply power to or draw power from the DC link in accordance with the calculated target power.

3. The system of claim 2, wherein the power converter is configured to:
- supply power to the DC link if the error value is positive.

4. The system of claim 3, wherein the power converter is configured to increase the target power to supply to the DC link in response to an increase in a magnitude of the error value.

5. The system of claim 2, wherein the power converter is configured to:
- draw power from the DC link if the error value is negative.

6. The system of claim 2, wherein:
- the power converter is configured to calculate the target power to supply to or draw from the DC link based on a proportional term; and
- the proportional term is obtained by multiplying the error value by a proportional coefficient.

7. The system of claim 6, wherein
- the power converter is configured to calculate the target power to supply to or draw from the DC link based on the proportional term and an integral term; and
- the integral term is obtained by multiplying a time-integral of the error value by an integral coefficient.

8. The system of claim 1, further comprising the load, wherein the operating voltage setpoint is a first operating voltage setpoint, and wherein
- the load is configured to:
  - draw power from the DC link;
  - monitor the voltage of the DC link; and
  - reduce the power drawn from the DC link in response to a determination that the monitored voltage of the DC link is below a second operating voltage setpoint.

9. The system of claim 8, wherein
- the load is one of a plurality of loads electrically coupled to the DC link; and
- each load is configured to:
  - draw power from the DC link;
  - monitor the voltage of the DC link; and
  - reduce the power drawn from the DC link in response to a determination that the monitored voltage of the DC link is below the second operating voltage setpoint.

10. The system of claim 8, wherein the or each load is configured to:
- calculate an error value, wherein the error value is a result of subtracting the monitored voltage of the DC link from the second operating voltage setpoint;
- calculate a target power to draw from the DC link based on the error value; and
- draw power from the DC link in accordance with the calculated target power.

11. The system of claim 10, wherein
- the or each load is configured to calculate the target power to draw from the DC link based on a proportional term; and
- the proportional term is obtained by multiplying the error value by a proportional coefficient.

12. The system of claim 11, wherein the or each load is configured to calculate the target power to draw from the DC link based on the proportional term and an integral term; and the integral term is obtained by multiplying a time-integral of the error value by an integral coefficient.

13. The system of claim 8, wherein the or each load includes a further power converter configured to generate an output voltage, and wherein the further power converter is configured to vary the output voltage and/or a frequency of the output voltage to reduce the power drawn from the DC link.

14. A transport refrigeration system comprising the system of claim 1 and a transport refrigeration unit.

15. The transport refrigeration system of claim 14, wherein the or each load includes a further power converter, and wherein the or each further power converter is electrically coupled to a motor, and wherein the motor is configured to drive a compressor, a pump or a fan of the transport refrigeration unit.

* * * * *